C. DUVAL & J. H. MORTON.
CHURN-DASHERS.

No. 185,088. Patented Dec. 5, 1876.

Witnesses:
Clarence Poole
R. K. Evans

Inventors:
Chas. Duval
Jacob H. Morton
per atty
A. H. Evans & Co.

UNITED STATES PATENT OFFICE.

CHARLES DUVAL AND JACOB H. MORTON, OF UNION CITY, TENNESSEE.

IMPROVEMENT IN CHURN-DASHERS.

Specification forming part of Letters Patent No. 185,088, dated December 5, 1876; application filed October 21, 1876.

*To all whom it may concern:*

Be it known that we, CHARLES DUVAL and JACOB H. MORTON, of Union City, in the county of Obion and State of Tennessee, have invented a new and Improved Churn-Dasher; and we hereby declare the following to be a full, clear, and exact description thereof, reference being had to the accompanying drawings, making a part of this specification, in which—

Figure 1:
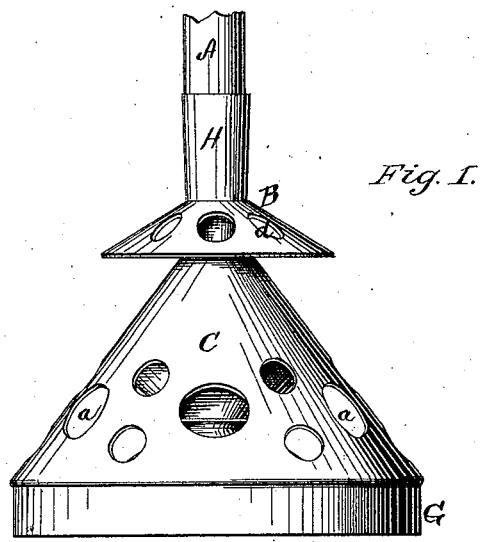
Figure 2:
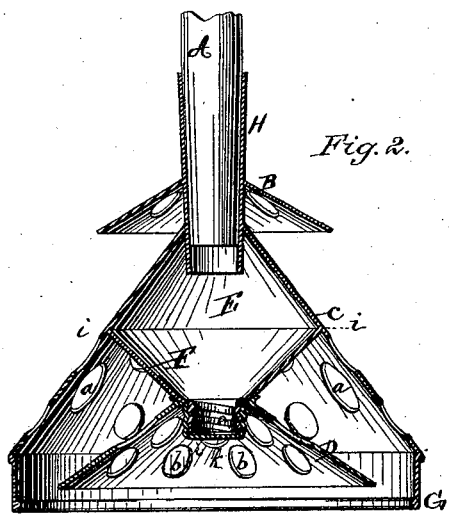

Figure 1 is a side elevation. Fig. 2 is a vertical section of the same.

Our invention consists in a dasher made with an outer perforated dasher provided with a solid depending rim, and having arranged within it a smaller conical perforated dasher, as hereinafter set forth.

To enable others skilled in the art to make and use our invention, we will proceed to describe the exact manner in which we have carried it out.

In the said drawings, A is the staff, and H is a sleeve or socket into which the staff fits. Arranged on the upper portion of the sleeve is a conical perforated blade or beater, B, having its lower open face flaring. A longer conical perforated beater, C, is attached lower down on the sleeve H, and provided at its lower edge with a cylindrical projection or rim, G, which serves as a butter-gatherer, and also confines the milk in some degree to be forced through the perforations a. Inserted within the beater C is an inverted truncated cone, F, attached to the beater C at i i, and provided with a screw-thread, e, at its lower end. On the thread e is fitted and screwed a close cap, e', which thus renders the chamber or reservoir E water-tight. In this reservoir is placed the warm or cold water for tempering the milk. The screw-cap e' is easily removed for the purpose of cleaning the dasher. Attached to the cap e' is another conical beater, D, its lower edge being above the lower edge of the rim G. By this construction the beater D also aids as a butter-gatherer, while a combination of the perforated beaters C and D results in giving to the milk a double current as the milk meets between the said dashers, and is again forced through the outside dasher.

Having thus described our invention, what we claim as new, and desire to secure by Letters Patent, is—

The beater C, provided with the rim G, in combination with the inner perforated beater D, constructed and arranged substantially as and for the purpose set forth.

CHARLES DUVAL.
JACOB H. MORTON.

Witnesses:
W. I. INMAN,
W. J. ROBERTS.